UNITED STATES PATENT OFFICE.

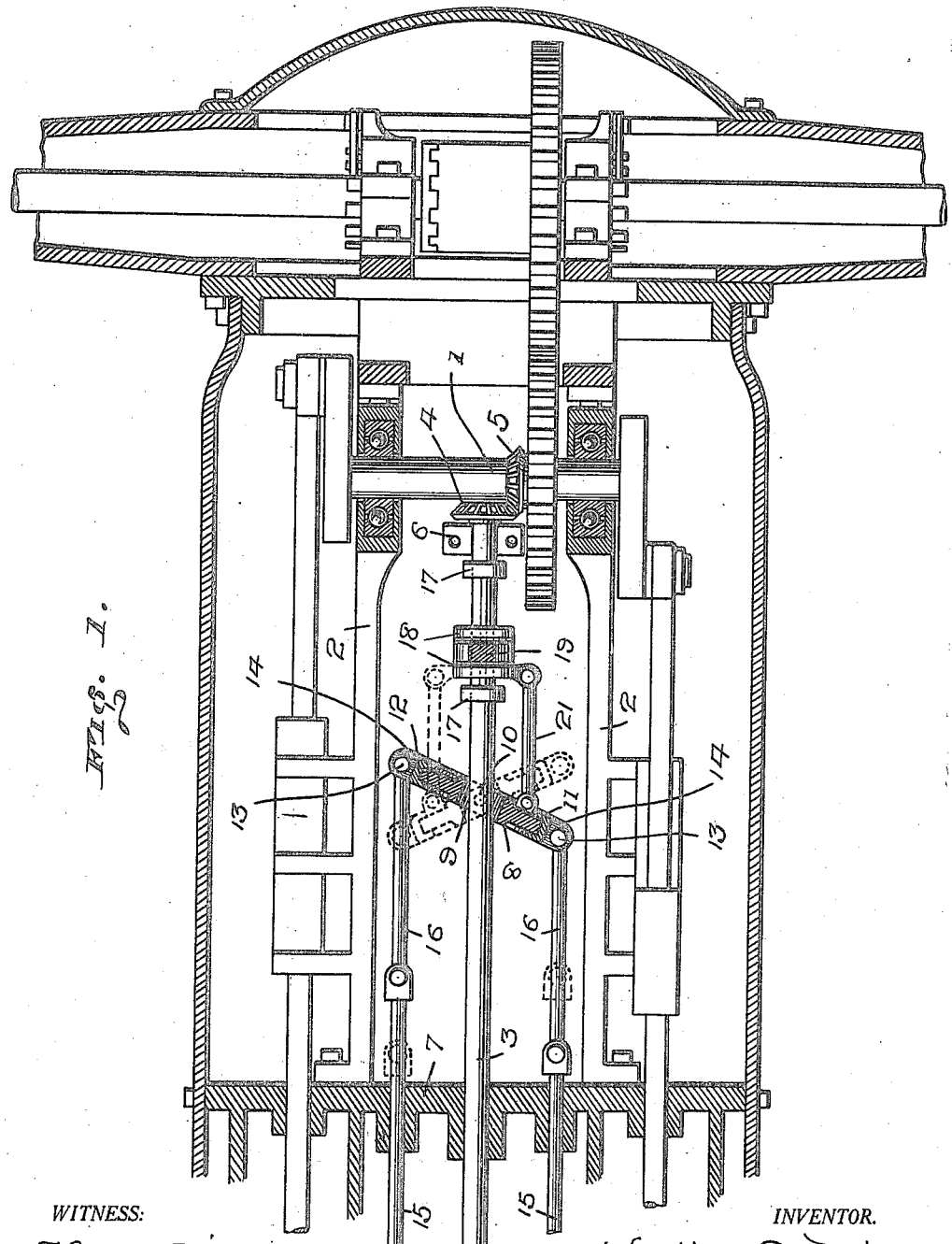

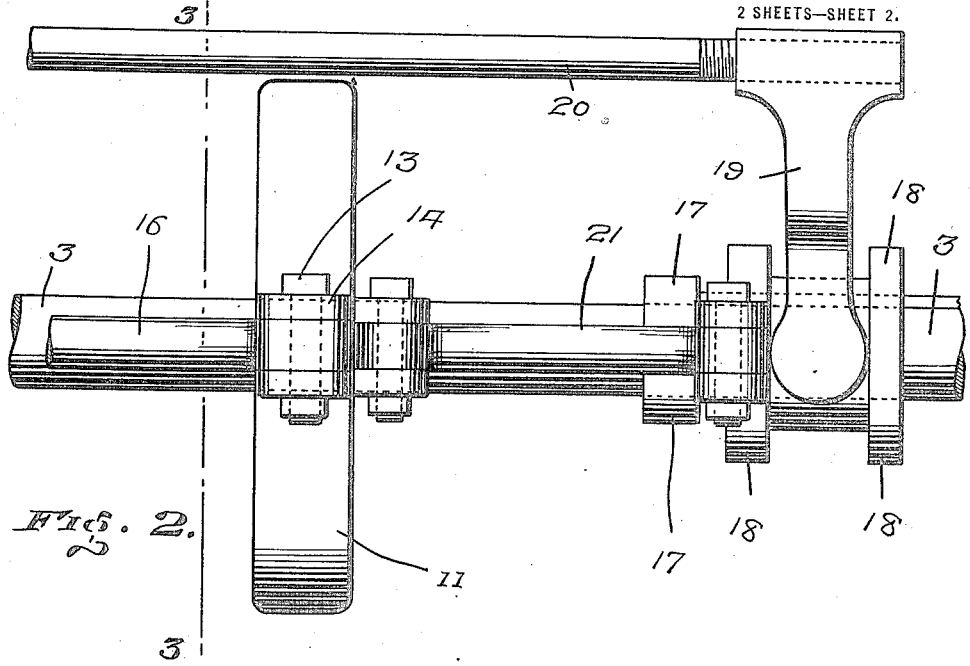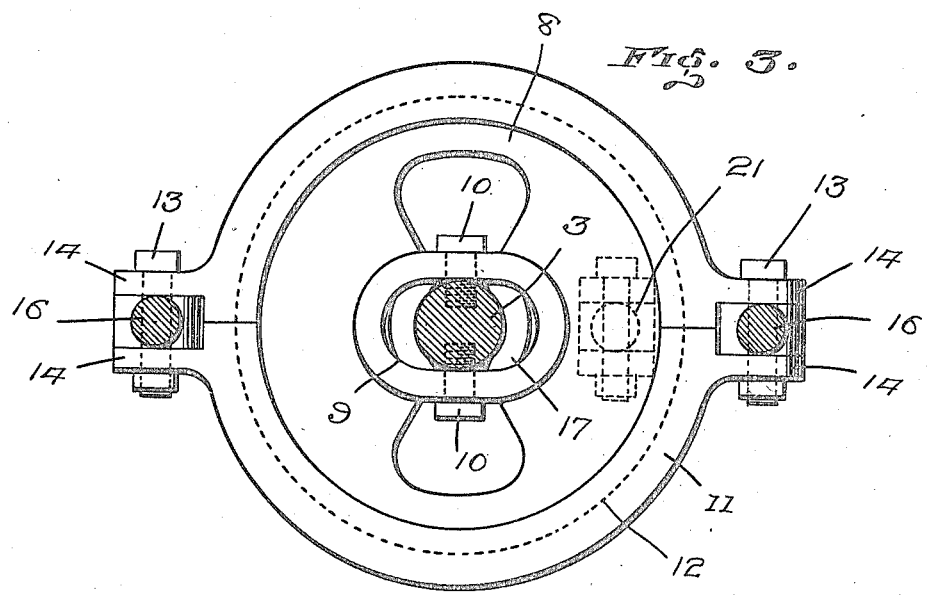

HARTLEY O. BAKER, OF PUEBLO, COLORADO, ASSIGNOR TO THE BAKER STEAM MOTOR CAR AND MANUFACTURING CO., INC., OF PUEBLO, COLORADO.

VALVE GEAR.

1,424,146.  Specification of Letters Patent.  Patented Aug. 1, 1922.

Application filed October 19, 1918. Serial No. 258,800.

*To all whom it may concern:*

Be it known that I, HARTLEY O. BAKER, a citizen of the United States, residing at Pueblo, in the county of Pueblo and State of Colorado, have invented certain new and useful Improvements in Valve Gears; and I do hereby declare the following to be a full, clear, and exact description of the invention, such as will enable others skilled in the art to which it appertains to make and use the same.

This invention relates to valve gears, and more especially to mechanical movements for use in such gears, it being the object of the invention to provide a novel and improved construction including a cam wheel adjustably mounted on a shaft and a shoe mounted on the cam wheel for reciprocating links or other parts connected to the shoe.

A further object is the provision of novel means for mounting the cam wheel on the shaft, and a still further object is the provision of a novel shoe mounted on the wheel for the connection of the links.

With these and other objects in view, the invention comprises the various novel features of construction and arrangement of parts as will be fully described hereinafter and afterwards specifically claimed.

Referring to the drawings:

Figure 1 represents a sectional plan view showing the valve gear arranged in operative position, Figure 2 represents an enlarged elevation of the valve gear, and Figure 3 represents a sectional view taken on a plane indicated by the line 3—3 on Figure 2.

In order that the construction and operation of the invention may be readily comprehended by those skilled in the art to which the invention relates, I have illustrated the preferred embodiment of the device in the accompanying drawings and will now proceed to fully describe the same in connection with said drawings wherein 1 is the engine crank shaft journalled in suitable bearings in the engine frame 2. 3 is a drive shaft disposed longitudinally through the engine, one end of the shaft extending on beyond the front of the engine for suitable driving purposes while the other end is provided with a bevel gear 4 meshing with a similar gear 5 on the crank shaft 1 whereby the shaft 3 is directly driven from the main crank movement. The inner end of the shaft 3 is supported in a suitable bearing 6 while the outer end is journaled in the rear cylinder head plate or other desirable part of the engine 7.

Mounted on this shaft 3 at a point removed from its inner end is what I term an adjustable variable cam which comprises a cam wheel 8 having a hub provided with an elongated opening 9 through which the shaft 3 passes. Pivot screws 10 extend through the hub at diametrically opposite points into the shaft 3 and serve to pivot the wheel cam for adjustment in a horizontal plane, yet cause it to revolve with the shaft.

An annular shoe 11 embodying complementary sections and provided with grooves 12 receive and surround the peripheral edge of the cam wheel 8, said shoe section being connected together by bolts 13 passing through ears 14 extending laterally therefrom.

15 are the valve rods slidably mounted through the part 7 of the engine and have their inner ends connected to the cam shoe by links 16, the inner ends of these links being pivoted loosely on the bolts 13 between the ears 14 as clearly shown in Figure 3. The valve rods 15 and links 16 are disposed in a longitudinal position with the shaft 3 extending longitudinally between them, thereby providing a compact and efficient arrangement.

Slidably feathered on the shaft 3 between stop collars 17 is a grooved collar 18 engaged by the lower end of a shifter fork 19 carried by a shifter rod 20 which extends through the engine and to within convenient reach of the engineer or driver.

21 represents a link connecting the collar 18 with the cam wheel 8, said link, collar 18 and cam wheel 8 being positioned to revolve with the shaft 3.

From the foregoing it will be apparent that the engine valves can be adjusted to cut off the steam to any point of movement of the piston by simply adjusting the shifter rod 20. This adjustment can be varied to any part of one half of the adjustable movement of the variable cam. Furthermore by shifting the position of the variable cam from one extreme position to the other, the engine valves will be shifted so as to reverse the engine.

While I have shown and described the preferred embodiment of my invention I desire to have it understood that such changes in construction, proportion and arrangement of parts can be made when desired as are within the scope of the appended claims.

What I claim is:

1. A mechanical movement for a valve gear comprising a shaft, a cam wheel pivotally mounted on said shaft to be swung to different positions, means mounted on said shaft and connected to said wheel for swinging same to different positions, an annular shoe mounted on the periphery of said wheel, and comprising complementary arcuate sections disposed end to end, securing means fastening the adjacent ends of said sections together, and links connected to said securing means to be reciprocated.

2. A mechanical movement for a valve gear comprising a shaft, a cam wheel pivotally mounted on said shaft to be swung to different positions, means mounted on the shaft and connected to said wheel for swinging same to different positions, an annular shoe mounted on the periphery of said wheel and comprising complementary arcuate sections disposed end to end and having spaced outstanding ears at their ends, securing elements extending through said ears to fasten the sections together, and links engaging said elements to be reciprocated, said links being disposed between said ears.

In testimony whereof I have signed my name to this specification in the presence of two subscribing witnesses.

HARTLEY O. BAKER.

Witnesses:
S. L. BROWN,
FRONIE ABELL.